United States Patent Office 3,274,146
Patented Sept. 20, 1966

3,274,146
POLYPROPYLENE STABILIZATION
Marilyn T. Lecher, Glen Mills, Pa., assignor to Sun Oil Company, Philadelphia, Pa., a corporation of New Jersey
No Drawing. Filed Dec. 5, 1961, Ser. No. 157,275
17 Claims. (Cl. 260—41)

This invention relates to the stabilization of solid, substantially crystalline, isotactic polypropylene, and more particularly to new compositions of matter comprising such a solid polymer of relatively high molecular weight and a synergistic heat and light stabilizing composition therefor.

Solid, substantially crystalline, isotactic polypropylene has been prepared by polymerizing propylene in the presence of a solid catalytic material. A catalyst system which is especially effective for such a polymerization is the combination of a halide of titanium, such as titanium trichloride, and an aluminum alkyl, such as aluminum triethyl or diethylaluminum chloride. In a typical procedure, the catalyst is prepared by admixing, for example, titanium tetrachloride and aluminum triethyl in an inert solvent such as isooctane to produce a reaction product which acts as a catalyst for polymerizing the alpha-olefin to solid polymers. On the other hand, a lower halide, such as titanium trichloride, can be preformed, dispersed in an inert liquid, and an activator, such as aluminum alkyl, added. In performing the polymerization step, the monomer is contacted with the solid catalyst, such as by passing the propylene into the liquid reaction mixture and is thereby polymerized to solid polymers. Anhydrous and oxygen-free conditions are used throughout the process, since the catalyst is deactivated by contact with water or oxygen. Other specific catalyst systems, i.e., other metal halide or metal oxide catalyst systems, as well as the other process conditions, necessary for the preparation of the polypropylene described herein are illustrated by pages 350 through 361, 416 through 419, 452 and 453 of "Linear and Stereoregular Addition Polymers" by Norman G. Gaylord and Herman F. Mark, Interscience Publishers, 1959, the contents of which are incorporated herein by reference.

Polypropylene prepared by the process described above has a melting point of from 160° C. to 175° C., a tensile strength of from 3,000 to 6,000 p.s.i. (pounds per square inch), and a molecular weight of from 50,000 to 850,000 or more (light-scattering). Usually a mixture of crystalline and amorphous polymer is obtained. If desired, the amorphous polymer can be separated from the crystalline polymer which is isotactic in nature by contacting a mixture thereof with a hydrocarbon solvent, such as isooctane or n-heptane, at an elevated temperature. The amorphous polymer is substantially soluble under these conditions, whereas the isotactic crystalline polymer is substantially insoluble. The compositions of the present invention are prepared from either crystalline polymers, or mixtures of crystalline with amorphous polymers, in which the mixture contains at least 25%, and preferably at least 50% by weight of the crystalline polymer as determined by X-ray diffraction.

Such polymers may be molded, extruded, or otherwise fabricated to form many useful articles. However, the above-described polypropylene is susceptible to degradation caused by exposure to light, particularly severe degradation of non-stabilized polypropylene takes place when it is exposed to light in the ultra-violet portion of the spectrum. In addition, the non-stabilized polypropylene described above is degraded by elevated temperature. Degradation apparently results from free-radical formation, which formation is promoted by heat, or ultra-violet light, and impurities such as metals and metal compounds. The free-radicals which are formed undergo further chemical reactions, resulting in undesirable chemical and physical transformations. Thus, polypropylene deteriorates prematurely, loses tensile strength, molecular weight and other desirable properties, such as pliability and impact strength, and becomes discolored and embrittled.

An object of the present invention is to provide compositions comprising substantially crystalline, isotactic, solid polypropylene containing a minor quantity of a synergistic composition effective to stabilize the polymer against degradation. It is a specific object of this invention to provide compositions comprising the above-described polypropylene containing minor quantities of a synergistic stabilizing composition effective to substantially prevent degradation of the polymer caused by exposure to light, particularly the ultra-violet portion of the spectrum. It is another specific object of this invention to provide compositions comprising the above-described polypropylene containing minor quantities of a synergistic stabilizing composition effective to substantially prevent degradation of the polymer caused by heat. It is a further object of this invention to provide a method by which polypropylene is so-stabilized.

According to one embodiment of the present invention, it has been found that remarkably stable polypropylene compositions are obtained by admixing with the substantially crystalline, solid, isotactic polymer a stabilizing quantity of each of: (1) carbon black, (2) a trithiophosphite, the alcohol moieties of which are cyclic or acyclic hydrocarbon radicals containing 6 to 20 carbon atoms, and (3) a tris-phenol having the general formula:

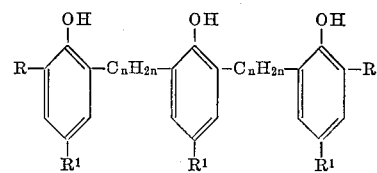

wherein $n$ is from 0 to 8, R and $R^1$ are hydrocarbon radicals containing 1 to 16 carbon atoms, R preferably being a secondary or tertiary hydrocarbon radical.

Illustrative of the foregoing trithiophosphites are those having the formula:

$$(RS)_3P$$

wherein R is an alkyl, aryl, or cycloalkyl radical containing 6 to 20 carbon atoms, e.g. trilauryl trithiophosphite, tricetyl trithiophosphite, tridecyl trithiophosphite, triphenyl trithiophosphite, tribenzyl trithiophosphite, tricyclohexyl trithiophosphite, dilauryl stearyl trithiophosphite, distearyl lauryl trithiophosphite, tri-(2-ethyl-hexyl) trithiophosphite, trinaphthyl trithiophosphite, phenyl didecyl trithiophosphite, tristearyl trithiophosphite, and diphenyl lauryl trithiophosphite.

Examples of suitable tris-phenols which are useful according to this invention include 2,6-bis-(2-hydroxy-3-t-butyl-5-methylbenzyl)-4-methylphenol,
2,6-bis-(2-hydroxy-3-t-amyl-5-isopropylbenzyl)-4-isopropylphenol,
2,6-bis-(4-hydroxy-3,5-ditertiarybutylbenzyl)-4-methylphenol,
2,6-bis(2-hydroxy-3-t-butyl-alpha-5-dimethylbenzyl)-p-cresol (i.e. the hydrocarbon bridges are ethylidene groups),
2,6-bis-(2-hydroxy-3-tertiarylbutyl-alpha,alpha-5-trimethylbenzyl)-p-cresol,
2,6-bis-(2-hydroxy-3,5-di-sec.butylbenzyl)-p-cresol,
2,6-bis-(2-hydroxy-3,5-ditertiarybutyl-alpha,alpha-dimethylbenzyl)-tertiarybutylphenol,
2,6-bis-(2-hydroxy-3-tertiarybutyl-5-ethylbenzyl)-4-methylphenol,
2,6-bis-(2-hydroxy-3-tertiarybutyl-5-n-propylbenzyl)-4-methylphenol, and the like.

The use of stabilizing quantity, e.g. from about 0.01% to about 5% by weight of each of the three aforementioned components of the stabilizing composition of this invention, preferably about 0.2% to about 2.0% of each, in combination with the polypropylene described herein imparts remarkable stability thereto against degradation caused by exposure to heat and to light, particularly that portion of the spectrum which includes ultra-violet light.

Numerous stabilizers have been disclosed in the prior art for arresting degradation of other olefin polymers. However, it has been found that virtually none of them is useful in the polypropylene of this invention; see page 192, volume 37, No. 5, of "Modern Plastics," January 1960. For example, various hydroxy-alkoxy-benzophenones and alkyl-phenyl-salicylates have been used in the past as ultra-violet stabilizers in various polymers, including polyethylene. But Examples 35 through 44 of Tomlinson et al. U.S. application Serial No. 34,384, filed June 7, 1960, show that polypropylene monofilaments containing 2,2'-dihydroxy-4-methoxy-benzophenone, 2,2'-dihydroxy-4-octoxy-benzophenone, 2-hydroxy-4-methoxy-benzophenone, or octyl-phenyl-salicylate in quantities ranging from 0.1 to 2.0% by weight are no more stable to the irradiations of an Atlas Fade-ometer than are polypropylene monofilaments containing no additive of any kind. It is clear then that the probable mechanism by which the olefin polymers known heretofore degrade is entirely different from the mechanism by which polypropylene degrades. Accordingly, the mechanism by which polypropylene is stabilized is unrelated to that by which other olefin polymers are stabilized.

Carbon black has been used in the past in various polymers as a convenient pigment of filler. Indeed, it has been suggested that carbon black be used in various polymers as a light stabilizer, e.g., polyethylene; however, it imparts little or no heat stability to polypropylene. Similarly, Casey discloses and claims the use of various trithiophosphites as a heat and light stabilizer for polypropylene in U.S. application Serial No. 849,185, filed October 28, 1959. Tris-phenols of the type disclosed and claimed herein are disclosed and claimed as heat stabilizers for polypropylene in Casey application Serial No. 46,094, filed July 29, 1960. However, as will be apparent from the data herein, it has been unexpectedly found that the combination of this invention synergistically stabilizes polypropylene against the degrading action of both light and heat. In this connection it is significant that the addition of carbon black to a conventional heat and processing stabilizer system containing dilauryl thiodipropionate, 2,6-ditertiary butyl-4-methyl phenol and calcium stearate in polypropylene results in drastically reduced heat stability (cf. Controls L and M herein).

Each of the components of the stabilizer composition may be combined with polypropylene by any method suitable for the preparation of homogeneous mixtures. For example, the polymer may be melted and the components of the synergistic composition of this invention admixed therewith by milling on heated rolls or by using a Banbury mixer. Alternatively, the stabilizer components may be combined, in a solid or liquid state, with a solution or suspension of the polymer in a suitable liquid. In another process, one dissolves one or both of the organic stabilizer components in a suitable solvent, admixes powdered polymer and carbon black therewith, and evaporates the solvent. In another mode of operation, the solid stabilizer components are thoroughly dry-mixed with the solid polymer. In general, it is preferable that the mixing process be carried out in an inert atmosphere, or under vacuum, in order to prevent oxidation of the polymer.

Several criteria are used to determine the effectiveness of the stabilizers in the compositions of this invention. Since non-stabilized polypropylene is normally drastically degraded when exposed to ultra-violet and visible light, particularly the high ultra-violet and the low visible light, the extent of this degradation is measured. One method of determining the extent of degradation involves the use of the Carbon-Arc Lamp Test in the Atlas Fade-ometer substantially in the manner described in Standard Test Method 16A–1957 of the American Association of Textile Chemist and Colorists. According to this test, yarns (multifilaments) or mono-filaments under tension are exposed to the light produced by a carbon arc. Every 20 hours the filaments are examined to determine whether or not there has been any breakage. If so, the test is terminated; if not the test is continued until breakage occurs. Meanwhile, at 60 hour intervals the filaments are tested on an Instron Tensile Tester and compared with unexposed filaments. In the illustrative examples given below, the filaments (i.e., mono- or multifilaments) are wound on standard black faced "mirror" cards (6½ x 9⅓ inches) and secured thereto at the margins with cellophane tape. Winding thereof is performed using a Universal winding device at a tension of 0.75 g., and when so wound, each card contains 3 groups of filaments having 5 to 8 monofilaments or multifilaments in each group.

In addition to degration caused by exposure to light, non-stabilized polypropylene is rapidly degraded by exposure to elevated temperature during fabrication and use. Virtually none of the materials known as ultra-violet stabilizers for other polymers contribute to the heat stability of that polymer. Unexpectedly, the combination of this invention imparts outstanding light and heat stability to polypropylene.

Heat degradation of molded polypropylene articles is made evident by discoloration thereof and crazing and crumbling of the surface thereof. Crazing consists of small surface cracks which, once they are started, progress rapidly until the entire surface is affected in this manner. Crumbling also progresses quite rapidly after it first becomes noticeable; the molded article becomes so friable that edges and corners are easily rubbed off with one's fingers.

In the examples given below, the molded articles were sheets, 3/32 inch to ⅛ inch thick, as thicknesses above 3/32 inch appear to have little or no effect on the resistance of the polypropylene to heat. The molded sheets were placed in an oven and held at 280° F. until crazing appeared, or, absent crazing, until an edge or corner became friable. The oven life given in the examples for molded articles is then the number of hours at 280° F. which expired until crazing or crumbling occurred.

Moreover, in the examples given below, heat stability is measured on polypropylene fibers in the following manner. Four monofilaments from each sample are tied to a glass rod which is then placed in a forced air oven in a horizontal position. Each fiber is held taut in a vertical position by means of a glass weight tied to the lower end of the fiber. This weight applies a tension of about 0.01 to 0.015 grams per denier to the fiber. The oven is held at 125° C. air temperature and the oven life constitutes the number of hours the polypropylene filaments remain exposed to this temperature and atmosphere without breaking.

The following examples are given by way of illustration and not by way of limitation, the scope of the invention being determined by the appended claims. In these examples, all percentages are based upon the weight of the composition, i.e. polypropylene plus additives.

*Example 1*

Polypropylene molded sheets containing (I) 0.25% of 2,6 - bis - (2-hydroxy-3-t-butyl-5-methyl-benzyl)-4-methyl phenol, (II) 0.50% of trilauryl trithiophosphite and (III) 2.5% of carbon black were prepared. Similarly, various molded sheets were prepared as controls, Control A containing 0.5% of tris-phenol (I), Control B containing 0.5% of phosphite (II), Control C containing 0.25% of tris-phenol (I) and 0.25% of phosphite (II), and Control D containing 0.50% of tris-phenol (I) and 2.5% of carbon black. The results obtained by exposing such molded sheets in an air oven at 280° F., as described hereinabove, are shown in Table I.

TABLE I

Formulation: Oven life (hours)
  Example 1 (I+II+III) _____ 1506
  Control:
    A (I) _____ 1128
    B (II) _____ 144
    C (I+II) _____ 1104
    D (I+III) _____ 216

As Controls A and D illustrate, the addition of carbon black to tris-phenol (I) drastically decreases the stability of the polymer composition. Moreover, Control B shows that phosphite (II) imparts much less stability to the molded polypropylene sheet than does tris-phenol (I), and this is further borne out in that the combination of tris-phenol (I) and phosphite (II) in Control C imparts less stability to the polymer than does (I) alone. In view of the foregoing observations regarding Controls A, B, C, and D, it would be expected that the composition of Example 1 would impart an oven life in the range between 216 hours and 1104 hours. Unexpectedly the oven life of Example 1 greatly exceeds those of any of Controls A, B, C, or D.

*Example 2*

Polypropylene monofilaments were melt-spun containing (IV) 1% of carbon black, (V) 0.75% of trilauryl trithiophosphite, and (VI) 0.25% of 2,6-bis-(2-hydroxy-3 - t - butyl - 5 - methyl-benzyl)-4-methyl-phenol. These monofilaments were exposed in an Atlas Fade-ometer and the data found in Table II were compiled therefrom in the manner described above.

Five sets of control monofilaments were melt-spun also and designated E, F, G, H, and J. Control filaments E consisted of polypropylene and 1% by weight of carbon black; F consisted of polypropylene and 0.5% of phosphite (V); G consisted of polypropylene and 1.0% of phosphite (V); H consisted of said polymer and 0.25% of tris-phenol (VI), and J consisted of polypropylene alone. These control monofilaments were exposed in an Atlas Fade-ometer in the same manner as the monofilaments of Example 1 to give the data tabulated in Table II.

Duplicates of the monofilaments of each of Example 2 and Controls E through H and J. were exposed to a temperature of 125° C. in an air oven. The hours to break thereof appearing in Table II is an average from four monofilaments for each of Example 2 and Controls E through H and J.

TABLE II

| Formulation | Fade-ometer Hours to break | Denier | Tenacity Retained Fade-ometer Hours | Oven Hours to Break |
|---|---|---|---|---|
| Example 2 | No break at 3,500. | 113 | 53.5% at 1,700 | 2,370 |
| Control: | | | | |
| E | Broken Between 800 and 820. | 132 | 36% at 500 | 63 |
| F | Broken Between 60 and 80. | 154 | | 20 |
| G | Broken Between 80 and 100. | 176 | | 47 |
| H | Broken Between 20 and 40. | ~150 | | 128 |
| J | Broken Between 0 and 20. | 130 | None at 20 | 12 |

It is apparent from Table II that the combination of additives disclosed and claimed herein in one exhibiting synergistic behavior. Thus, were the effect merely additive, one would expect the filaments of Example 2 to break at some point between 890 and 950 hours in the Fade-ometer, whereas no breaks had occurred in the filaments of Example 2 after 3500 hours. The heat stability of the formulation of this invention is truly synergistic also since one would expect broken filaments at some point between 210 and 240 hours in the oven, whereas the filaments of Example 2 broke at 2370 hours.

*Example 3*

The procedure of Example 2 was repeated in the Fade-ometer except that 2.5% of carbon black was used. No failure had occurred after 4980 hours in the Fade-ometer, and the filaments retained 62.4% of original tenacity at this point.

CONTROLS L AND M

Polypropylene molded sheets were prepared containing 0.25% of 2,6-di-tertiary butyl-4-methylphenol, 0.25% di-lauryl-thiodipropionate and 0.15% of calcium stearate to give control L. A second set of molded sheets was prepared containing the foregoing additives + 2.5% of carbon black to give control M. These sheets were tested in an air oven at 280° F. in the same manner as those in Example 1. Whereas control L, containing no carbon black had an oven life of 1460 hours, control M had an oven life of only 250 hours.

The invention claimed is:
1. A light and heat stable composition comprising solid, isotactic, substantially crystalline polypropylene and a stabilizing quantity of each of of (A) carbon black, (B) a compound having the formula:

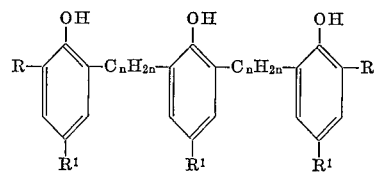

wherein $n$ is 1 to 3, and each of R and $R^1$ is a alkyl radical containing 1 to 16 carbon atoms, and (C) a compound having the formula:

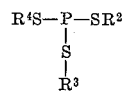

wherein each of $R^2$, $R^3$ and $R^4$ is a hydrocarbon radical containing 6 to 20 carbon atoms selected from the group consisting of alkyl, aryl and cycloalkyl radicals, said stabilizing quantity being sufficient to provide a synergistic stabilizing effect by the combination of components (A), (B) and (C).

2. The composition of claim 1 wherein said stabilizing quantity is from about 0.01% to about 5% by weight of each of components (A), (B), and (C) based on the weight of said composition.

3. The composition of claim 2 wherein R is selected from the group consisting of secondary alkyl radicals and tertiary alkyl radicals.

4. The composition of claim 2 wherein each of $R^2$, $R^3$ and $R^4$ is an alkyl radical.

5. The composition of claim 1 wherein said stabilizing quantity is from about 0.2% to about 2% by weight of each of components A, B, and C, based on the weight of said composition.

6. The composition of claim 5 wherein R is selected from group consisting of secondary alkyl radicals and tertiary alkyl radicals.

7. The composition of claim 5 wherein each of $R^2$, $R^3$ and $R^4$ is an alkyl radical.

8. The composition of claim 7 wherein R is a tertiary alkyl radical and $R^1$ is a normal alkyl radical.

9. A process of inhibiting degradation of polypropylene shaped articles caused by exposure to heat and light which comprises admixing solid, isotactic, substantially crystalline polypropylene and a stabilizing quantity of each of (A) carbon black, (B) a compound having the formula:

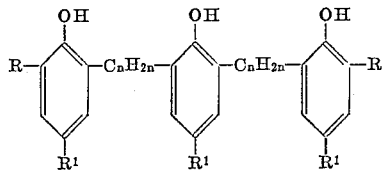

wherein $n$ is 1 to 3, and each of R and $R^1$ is an alkyl radical containing 1 to 16 carbon atoms, and (C) a compound having the formula:

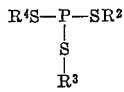

wherein each of $R^2$, $R^3$ and $R^4$ is a hydrocarbon radical containing 6 to 20 carbon atoms selected from the group consisting of alkyl, aryl and cycloalkyl radicals, mixing said polypropylene and components (A), (B) and (C) to provide an intimate mixture thereof, melting said mixture and forming shaped articles from said melt, said stabilizing quantity being sufficient to provide a synergistic stabilizing effect by the combination of components (A), (B) and (C).

10. The process of claim 9 wherein said stabilizing quantity is from about 0.01% to about 5% by weight of the combination of said polypropylene and each of components (A), (B), and (C).

11. The process of claim 10 wherein R is selected from the group consisting of secondary alkyl radicals and tertiary alkyl radicals.

12. The process of claim 10 wherein each of $R^2$, $R^3$ and $R^4$ is an alkyl radical.

13. The process of claim 9 wherein said stabilizing quantity is from about 0.2% to about 2% by weight of the combination of said polypropylene and each of components (A), (B), and (C).

14. The process of claim 13 wherein R is selected from group consisting of secondary alkyl radicals and tertiary alkyl radicals.

15. The processes of claim 13 wherein each of $R^2$, $R^3$ and $R^4$ is an alkyl radical.

16. The process of claim 15 wherein R is a tertiary alkyl radical and $R^1$ is a normal alkyl radical.

17. The process of claim 9 wherein said mixing step and said melting step are performed simultaneously.

References Cited by the Examiner
UNITED STATES PATENTS

| | | | |
|---|---|---|---|
| 2,819,329 | 1/1958 | Sullivan et al. | 260—45.95 |
| 2,824,847 | 2/1958 | Fath | 260—45.75 |
| 2,889,306 | 6/1959 | Hawkins et al. | |
| 2,967,845 | 1/1961 | Hawkins et al. | |
| 3,013,003 | 12/1961 | Maragliano et al. | 260—45.9 |
| 3,038,878 | 6/1962 | Bell et al. | 260—45.85 |

MORRIS LIEBMAN, *Primary Examiner.*

LEON J. BERCOVITZ, *Examiner.*

K. B. CLARKE, J. S. WALDRON, *Assistant Examiners.*